United States Patent [19]

Aoki et al.

[11] Patent Number: 4,811,148
[45] Date of Patent: Mar. 7, 1989

[54] ALLOY MAGNETIC RECORDING HEAD

[75] Inventors: Masaki Aoki, Mino; Masayuki Sakai, Minamikawachi; Hideo Torii, Higashiosaka; Hideyuki Okinaka, Toyonaka; Hozumi Hirota, Kouriyama, all of Japan

[73] Assignee: Matsushita Electric Industrial Co., Ltd., Osaka, Japan

[21] Appl. No.: 22,577

[22] Filed: Mar. 10, 1987

Related U.S. Application Data

[62] Division of Ser. No. 661,322, Oct. 16, 1984, abandoned.

[30] Foreign Application Priority Data

Mar. 6, 1984 [JP] Japan ................................. 59-41261

[51] Int. Cl.4 .......................... G11B 5/22; G11B 5/251
[52] U.S. Cl. .................................... 360/125; 360/110; 360/119; 360/120
[58] Field of Search ...................... 360/110, 119-120, 360/122, 125, 127; 29/603

[56] References Cited

U.S. PATENT DOCUMENTS

| 3,629,519 | 12/1971 | Hanak | 29/603 X |
| 3,639,701 | 2/1972 | Secrist et al. | 29/603 X |
| 3,672,045 | 6/1972 | Robertson | 29/603 X |
| 3,750,274 | 8/1973 | Bealle et al. | 29/603 |
| 4,182,643 | 1/1980 | Calderon, Jr. et al. | 360/120 X |

FOREIGN PATENT DOCUMENTS

| 2755513 | 6/1987 | Fed. Rep. of Germany | 360/119 |
| 2373850 | 7/1978 | France | |
| 2403615 | 4/1979 | France | |
| 58-130426 | 3/1983 | Japan | 360/119 |
| 0189816 | 11/1983 | Japan | 29/603 |
| 61-66209 | 4/1986 | Japan | 360/110 |

Primary Examiner—John H. Wolfe
Attorney, Agent, or Firm—Wenderoth, Lind & Ponack

[57] ABSTRACT

An iron-aluminum-silicon (Fe-Al-Si) series magnetic alloy magnetic head is described. The magnetic head is filled between front gap forming surfaces (the front gap facing a magnetic tape) of a pair of Fe-Al-Si core pieces with non-magnetic ceramic films formed on the respective front gap forming surfaces and a glass film formed therebetween, and between rear gap forming surfaces for junction with an Ag-Cu-In series alloy film.

5 Claims, 2 Drawing Sheets

ALLOY MAGNETIC RECORDING HEAD

This application is a division of now abandoned Ser. No. 661,322, filed Oct. 16, 1984.

BACKGROUND OF THE INVENTION

1. Field of the Invention

This invention relates to an alloy magnetic recording head.

2. Description of Prior Art

Recently, the magnetic recording technique is now in progress toward high densification. It is necessary for achievement of high density recording to restrict the spread of the magnetic field as much as possible from the viewpoint of record demagnetization. For this purpose, there has been desired a better head construction which ensures contact between the recording medium and the magnetic head, means to measure fine machining of the gap, and the discovery of high saturation magnetic flux density core materials which make it difficult to create magnetic saturation near the core gap (because the use of high coércive force magnetic recording medium is required from the self-demagnetization).

Now, a magnetic head has been recognized to be optimum when it has a narrow gap of high accuracy and uses an iron (Fe), aluminum (Al) and silicon (Si) series magnetic alloy (for example, Sendust) as a core material for the magnetic head of such high performance. Thus, such magnetic head has been earnestly desired in the field of magnetic recording.

However, it has been extremely difficult at this alloy to form at this alloy magnetic heads having narrow gaps of high accuracy from such Fe-Al-Si series alloy which has hindered the use of such magnetic heads. An example of the conventional method for forming an Fe-Al-Si series magnetic alloy (for example, Sendust) is shown in FIG. 1, in which a quartz ($SiO_2$) film 3 is formed by the spattering at the gap formation surface (the tape transportation surface) of a core 1, of an Fe-Al-Si series magnetic alloy at one side in FIG. 1 and then a core 2 of Fe-Al-Si series magnetic alloy at the other side is stuck to the core 1 by use of silver alloy brazing material 4, for example, a silver-copper-cadmium-zinc series alloy, of a low melting point. In this method, however, the Fe-Al-Si series magnetic alloy and quartz ($SiO_2$) used at the front gap forming portion at the tape transportation surface are largely different from each other in the coefficient of thermal expansion (the coefficient of thermal expansion of quartz is $1.7 \times 10^{-6}/°C$. and that of Fe-Al-Si alloy, $13.5 \times 10^{-6}/°C$.), so that the quartz film 3 is peeled off from the Fe-Al-Si series magnetic alloy during the tape transportation. This causes deterioration of the gap accuracy, in other words, it causes a break in the gap forming surface. The silver alloy brazing material 4 for a rear gap at the reverse side to the tape transportation surface generally uses a silver-copper-cadmium-zinc series alloy foil of a low melting point in order to increase a bonding strength with the Fe-Al-Si series magnetic alloy. The brazing material is larger in its coefficient of thermal expansion (about 17 to $18 \times 10^{-6}/°C$.) and also larger in its counter diffusion to that of the Fe-Al-Si series magnetic alloy when both the cores 1 and 2 are bonded. This creates a problem in that cracks are developed at the Fe-Al-Si series alloy portion when the melting silver-alloy brazing material is solidified so that, under the influence of such cracks, it becomes difficult to control for the gap width and to ensure that the gap surfaces are parallel with one another.

SUMMARY OF THE INVENION

An object of the invention is to provide a magnetic head of a Fe-Al-Si series magnetic alloy which forms a narrow magnetic gap with high accuracy and enables the formed gap to have high mechanical strength.

The magnetic head of the Fe-Al-Si series magnetic alloy has a pair of Fe-Al-Si alloy core pieces which form a front gap facing a magnetic tape, the front gap being filled with non-magnetic ceramic films formed on respective front gap forming surfaces and a glass film formed therebetween, and a rear gap for junction, the rear gap being filled with a silver-copper-indium series alloy film.

The above and further objects and novel features of the invention will more fully appear from the following description in accordance with the accompanying drawings.

DESCRIPTION OF THE PREFERRED EMBODIMENTS

Next, an explanation will be given on the embodiments of the magnetic head of the invention.

EMBODIMENT 1

Figure 1:
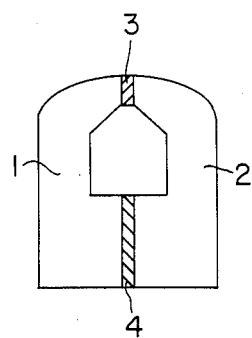
FIG. 1 is a sectional view of a conventional magnetic head piece of an Fe-Al-Si series magnetic alloy, FIGS. 2-(a), -(b) and -(c) are perspective exploded views of the embodiments of Fe-Al-Si series magnetic alloy cores of the invention respectively.
Figure 2A:
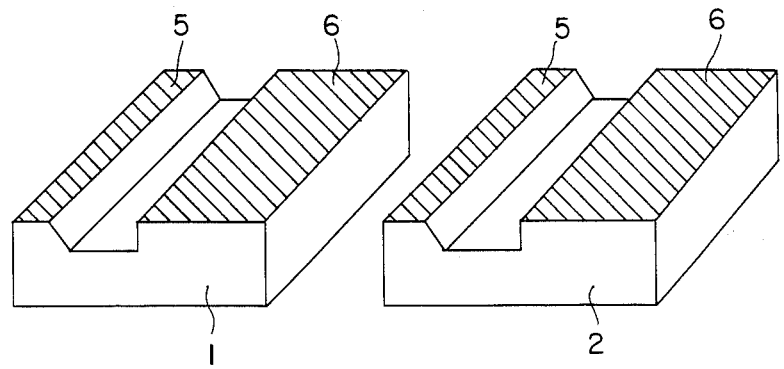
Figure 2B:
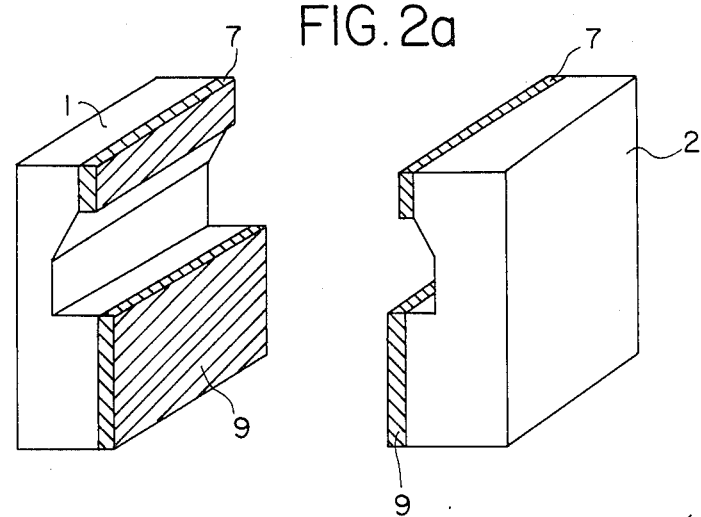
Figure 2C:
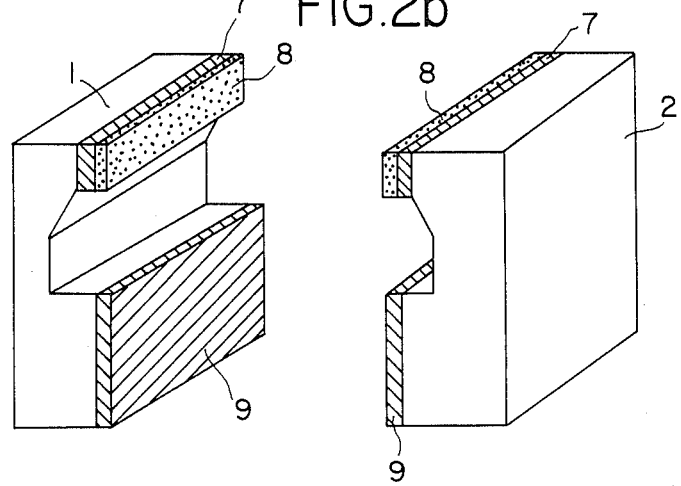

A Fe-Al-Si series magnetic alloy head piece similar to that in FIG. 1 has been formed and examined by the following method:

Referring to FIG. 2-(a), a pair of boat-like-shaped chips 1 and 2 for head pieces have been prepared, the chips 1 and 2 each being rod-like-shaped, 3 mm wide, 2 mm high, and 20 mm long, are formed of an Fe-Al-Si series magnetic alloy and grooved to be 0.35 mm wide by use of a diamond grindstone for housing the windings, and each front gap forming surface 5 and each rear gap forming surface 6 are mirror-polished (to the maximum roughness of R max$\times 0.01$ $\mu$m).

Next, a zirconium oxide ($ZrO_2$) film 7 is formed by use of the sputtering method, onto both the junction surfaces corresponding to the front gap as shown in FIG. 2-(b).

On the film 7 is formed a glass film (Glass of PbO of 75 wt.%, $SiO_2$ of 20 wt.% and $Na_2O$ of 5 wt.%) by the sputtering method. In this case, the rear gap forming surfaces were masked to be free from $ZrO_2$ or glass, the zirconium oxide film being 0.15 $\mu$m in uniform thickness, the glass film 0.05 $\mu$m in uniform thickness.

An Ag-Cu-In series alloy film 9 is formed at each junction surface at the rear gap forming portion by use of the sputtering method. In this case, the front gp forming surfaces are masked to be free from the Ag-Cu-In series alloy, the Ag-Cu-In film being 0.15 $\mu$m in uniform thickness and comprising Ag of 75 wt.%, Cu of 10 wt.% and In of 15 wt.%.

The $ZrO_2$ films and glass films at the front gap side and the Ag-Cu-In film at the rear gap side are allowed to abut at the same kind of films against each other so that the opposite chips at the pair of head pieces of Fe-Al-Si alloy were subjected to the heat treatment in a $N_2$ atmosphere at one air pressure and a temperature of 900° C. and the films to be stuck were processed by the diffused junction.

Figure 3:
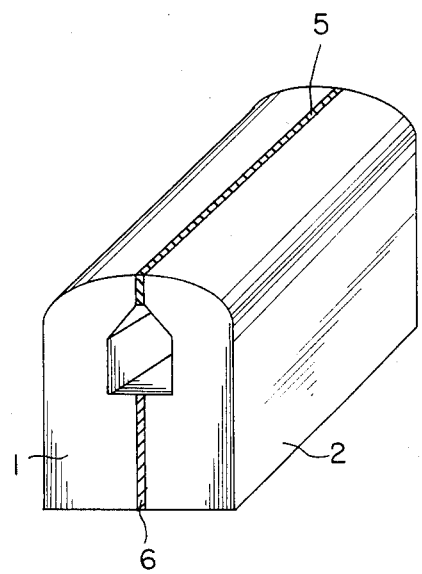
FIG. 3 is a perspective view of an embodiment of an Fe-Al-Si series magnetic alloy magnetic head piece of the invention.

A rod of head piece as shown in FIG. 3 was cut and mechanically polished to obtain an Fe-Al-Si series magnetic alloy head piece with a film of 150 $\mu m$ in thickness.

The head piece of the Fe-Al-Si series magnetic alloy film was polished at the front gap and rear gap portions and measured inside by an optical microscope. As a result, it was observed that front and rear gaps each were 0.30 $\mu m$ in width and parallel to each other in the gap surfaces, and also since the coefficient of thermal expansion of material for forming both the front and rear gaps was about equal to that of Fe-Al-Si series magnetic alloy, no cracks were created at the junction surfaces. Furthermore, in order to examine the mechanical strength of the gap formed portions, the Fe-Al-Si series magnetic alloy at both sides of a gap was subjected to the tensile test at a stress of 3 kg/mm$^2$, but the junction surfaces were not separated showing that the cores were also superior also in mechanical strength. Furthermore, when the front head was machined to a 25 $\mu m$ in track width and a magnetic tape (of coércive force $H_c$; 1400 oersted and saturation magnetic flux density $B_s$: 3000 gauss) was transported through the magnetic head at relative speed of 3.45 m/sec, no breaks were found at the gaps. In addition, when a coil was found (25 turns) into the groove of the head, the reproducing output voltage at the head at 5 MHz was 250 $\mu V$ (peak to peak).

The results of the above measurement are shown in specimen No. 2 in Table 1.

Specimens which were changed in the material of non-magnetic film at the front gap portion and in composition of the Ag-Cu-In series alloy were measured by the same method as the above and the results of measurement are shown in Specimen Nos. 1 and 3 to 12 in Table 1.

In addition, in this embodiment, as to composition of the Fe-Al-Si series magnetic core piece having influence on the magnetic properties, an analysis using an X-ray microanalyzer would confirm that the composition was not at all changed before and after the heat treatment. As a result, the saturation magnetic flux density $B_s$ of the Fe-Al-Si series magnetic alloy is 8650 gauss; the coércive force $H_c$, 0.03 oersted; and the A.C. initial magnetic permeability $\mu$, 61 (where for 200 mm thickness); and no change of the magnetic properties by the heat treatment was seen. Also, it could be confirmed that ions of Mg, Al or Zr was not diffused more than 0.01 $\mu m$ in depth wihin the Sendust alloy.

Here, it can be seen that the composition of the Ag-Cu-In film effective in junction is included in a range of Cu of 10 to 50 wt.% and In a range of 1 to 30 wt.%. Other compositions not included in the above range were not proper because of the short wettability with the Fe-Al-Si alloy or because of the high temperature appearance of the liquid phase. In addition, since Specimen No. 1, shown as the comparison example, was not joined, observations of the gap width, the tape transportation test, and the magnetic properties were not measured. Also, Specimen No. 6 was peeled by machining after junction, whereby no measurement was carried out.

COMPARISON EXAMPLE 1

For the purpose of comparison, a head piece having the gap was formed by a conventional method. In detail, a hard quartz film of 0.15 $\mu m$ in thickness was formed at the front gap portion and the head piece was welded to the rear gap portion by use of an Ag-Cu-Zn-Cd series alloy foil so as to manufacture a Fe-Al-Si series magnetic alloy head. As to the gap portions at this head, the test piece was tested the same as the embodiment.

As a result, the films at this magnetic piece were not peeled even by the tensile test using stress of 3 kg-mm$^2$, but the parallelism of both side surfaces of the gap was remarkably deteriorated, the front gap being 0.53 $\mu m$ wide and the rear gap, 0.24 $\mu m$ in width. Then, when the front gap portion of the head was machined and the magnetic tape was transported, a break was created at the gap portion.

In addition, when a coil was wound in 25 turns into the wiring groove at the head, the reproducing output voltage of the heat at 5 MHz was 50 $\mu V_{p-p}$.

The results of the above are shown in Specimen No. 13 in Table 1.

TABLE 1

| Specimen No. | Front Gap Material | Front Gap Film Thickness (one side) | Rear Gap Material (wt. %) | Rear Gap Film Thickness (one side) | Optical Front gap ($\mu m$) | Parallelism and Sendust Junction Surface Condition | Gap Condition during Tape Transportation | Reproducing Output Voltage at 5 MHz $\mu v(p-p)$ |
|---|---|---|---|---|---|---|---|---|
| 1* | $ZrO_2$ Glass | 0.15 $\mu m$ 0.05 $\mu m$ | Ag—Cu—In (85)(0)(15) | 0.15 $\mu m$ | — | — | — | — |
| 2 | $ZrO_2$ Glass | 0.15 $\mu m$ 0.05 $\mu m$ | (75)(10)(15) | " | 0.30 | Good | Good | 250 |
| 3 | $ZrO_2$ Glass | 0.15 $\mu m$ 0.05 $\mu m$ | (65)(20)(15) | " | " | " | " | 248 |
| 4 | $ZrO_2$ Glass | 0.15 $\mu m$ 0.05 $\mu m$ | (55)(30)(15) | " | " | " | " | 252 |
| 5 | $ZrO_2$ Glass | 0.15 $\mu m$ 0.05 $\mu m$ | (35)(50)(15) | " | " | " | " | 251 |
| 6* | MgO Glass | 0.15 $\mu m$ 0.05 $\mu m$ | (70)(30)(0) | " | 0.50 | Poor | — | — |
| 7 | MgO Glass | 0.15 $\mu m$ 0.05 $\mu m$ | (69)(30)(1) | " | 0.30 | Good | Good | 246 |
| 8 | MgO Glass | 0.15 $\mu m$ 0.05 $\mu m$ | (65)(30)(5) | " | " | " | " | 250 |
| 9 | MgO | 0.15 $\mu m$ | (60)(30)(10) | " | " | " | " | 248 |

TABLE 1-continued

| Specimen No. | Front Gap Material | Front Gap Film Thickness (one side) | Rear Gap Material (wt. %) | Rear Gap Film Thickness (one side) | Optical Front gap ($\mu$m) | Parallelism and Sendust Junction Surface Condition | Gap Condition during Tape Transportation | Reproducing Output Voltage at 5 MHz $\mu$v(p-p) |
|---|---|---|---|---|---|---|---|---|
| 10 | Glass<br>MgO | 0.05 $\mu$m<br>0.15 $\mu$m | (40)(30)(30) | " | " | " | " | 249 |
| 11 | Glass<br>Spinel | 0.05 $\mu$m<br>0.15 $\mu$m | (89)(10)(1) | " | " | " | " | 253 |
| 12 | Glass<br>Spinel | 0.05 $\mu$m<br>0.15 $\mu$m | (20)(50)(30) | " | " | " | " | 251 |
| 13* | Glass<br>Quartz (SiO$_2$) | 0.05 $\mu$m<br>0.15 $\mu$m | Ag—Cu—Zn—Cd (30)(27)(21)(22) | 1.0 $\mu$m | 0.53 | Poor cracking | Broken | 50 $\mu$V |

*Comparison example

EMBODIMENT 2

The Fe-Al-Si series magnetic alloy was processed by the same method as the embodiment 1 to manufacture chips of a pair of boat-like shaped head pieces.

Next, a zirconium oxide (ZrO$_2$) film is formed by use of sputtering on both front gap forming surfaces as shown in FIG. 2-(c) and then a glass film 8 is formed by the same method onto the same film 7 (in this case, the rear gap forming portions were masked to be free from ZrO$_2$ and glass). The aforesaid Zirconium film 7 was uniform in thickness of 0.10 $\mu$m, and the aforesaid glass film was uniform in thickness of 0.05 $\mu$m and comprising as main components: SiO$_2$ of 20 wt.%; PbO, 75 wt.%, and Na$_2$O of 5 wt.%.

Then, Ag-Cu-In series alloy films 9 were formed by use of the sputtering at both sides of the rear gap forming portion (where the front gap forming portions were masked to be free from Ag-Cu-In series alloy), in which the aforesaid Ag-Cu-In film is 0.15 $\mu$m in uniform thickness and is composed of Ag 55 weight %, Cu 30 wt.% and In 15 wt.%). The ZrO$_2$ and glass films at the front gap side and the Ag-Cu-In film at the rear gap side abut against each other to form a pair of Sendust chips, and are subjected to the heat treatment for one hour in a vacuum atmosphere ($1 \times 10^{-4}$ Torr) and at a temperature of 900° C. and at the diffused junction at the portion of pair of the Fe-Al-Si series magnetic alloy chips which are stuck together.

The rod obtained as abovementioned and of head piece shape in section as shown in FIG. 3 was cut and mechanically polished to a film of 150 $\mu$m in thickness, whereby an Fe-Al-Si series magnetic alloy head piece was obtained.

The obtained Fe-Al-Si series magnetic alloy head piece film was polished at the front gap and rear gap portions so that the gaps were measured therein by use of an optical microscope. As a result, both the front and gear gaps were 0.30 $\mu$m in width and the gap surfaces were observed to be parallel to each other. Moreover, since the coefficient of thermal expansion of material for the respective front and rear gap forming portions is about equal to that of Fe-Al-Si series magnetic alloy, no cracks were produced on the junction surfaces. Also, the Fe-Al-Si series magnetic alloy materials at both sides of gap forming portions were subjected to the tensile test using a stress of 3 kg-mm$^2$, in which the junction surfaces at the gap were not peeled, and also found to be superior in mechanical strength. Then, no breaks were produced at the gap forming portions when the front head was machined to have a track of 25 $\mu$m in width and the magnetic tape (of coércive force H$_c$ of 1400 oersted and saturation magnetic flux density B$_s$: 3000 gauss) was transported through the magnetic head at a relative speed of 3.45 m/sec. In addition, the reproducing output voltage of the head at 5 MHz when the wiring groove at the head was coiled in 25 turns, was 249 $\mu$V$_{p-p}$.

The results of the above measurement are shown in Table 2.

The specimen Nos. 14 and 16 to 23 in Table 2 show the results after various tests of the specimens which were changed in material in respect to the non-magnetic film at the front gap portions and in respect to the composition of the SiO$_2$-PbO-Na$_2$O series glass.

In this embodiment, as to the composition of the Fe-Al-Si series magnetic alloy chip having influence on the magnetic properties, it was confirmed by analysis using a X-ray microanalyzer that the composition was not at all changed before and after the heat treatment. As a result the Fe-Al-Si series magnetic alloy had a saturation magnetic flux density B$_s$ of 8650 gauss, the coércive force Hc of 0.03 oersted, and an AC initial magnetic permeability $\mu$ of 61 (at a thickness of 200 m) and no changes in the magnetic properties were seen as a result of the heat treatment. Also, it could be confirmed that ions of Mg, Al, or Zr, constituting the non-magnetic ceramic film were not diffused into the Fe-Al-Si alloy to a depth of 0.01 $\mu$m or more.

As seen from Table 2, the SiO$_2$-PbO-Na$_2$O series glass, when present in composition of SiO$_2$ of 20 to 80 wt.%, reacted on the ceramic film to form a strong front gap. In the case where the amount of SiO$_2$ is small and that of PbO is extremely larger (Specimen No. 14 in Table 2), the glass itself is very small in strength so as to cause a breakdown in the gap forming surfaces when the tape is transported. In the case of a large amount of SiO$_2$ (Specimen No. 19 in Table 2), since sufficient softening was not created under processing conditions at a temperature of 900° C., the glass film did not react on the ceramic film, in which the breakdown also occurred when the tape was transported. From the above, it is proper to use SiO$_2$ of 20 to 80 wt.%.

TABLE 2

| Specimen No. | Front Gap Material | Front Gap Film thickness (μm) | Front Gap Glass (wt. %) | Optical Film thickness (μm) | Optical Front Gap (μm) | Parallelism and Sendust Junction Surface Condition | Gap Condition when Tape is transported | Reproducing Output Voltage in 5 MHz μV(p-p) |
|---|---|---|---|---|---|---|---|---|
| 14* | Zirconium oxide | 0.10 μm | $SiO_2$—PbO—$Na_2O$ (10)(85)(5) | 0.05 μm | 0.30 | Good | Broken | 205 |
| 15 | Zirconium oxide | " | (20)(75)(5) | " | " | " | Good | 249 |
| 16 | Zirconium oxide | " | (40)(55)(5) | " | " | " | " | 246 |
| 17 | Zirconium oxide | " | (60)(35)(5) | " | " | " | " | 251 |
| 18 | Zirconium oxide | " | (80)(15)(5) | " | " | " | " | 249 |
| 19* | Zirconium oxide | " | (90)(5)(5) | " | " | " | Broken | 200 |
| 20 | Magnesium Oxide | " | (50)(49)(1) | " | " | " | Good | 245 |
| 21 | Magnesium Oxide | " | (50)(45)(5) | " | " | " | " | 251 |
| 22 | Spinel | " | (50)(40)(10) | " | " | " | " | 249 |
| 23 | Spinel | " | (50)(35)(15) | " | " | " | " | 250 |

*Comparison Example

As seen from the above description and Tables 1 and 2, the Fe-Al-Si alloy magnetic recording head of the invention forms the non-magnetic ceramic film and glass film, of thickness with high accuracy, at the front gap forming surfaces (magnetic tape transportation surfaces) of a pair of Fe-Al-Si alloy chips to be coupled into a form of magnetic head, and forms the silver brazing (Ag-Cu-In series) film at the rear gap forming surfaces. Thus, while the same kinds of gap forming surfaces are abutting against each other and the pair of Fe-Al-Si core pieces are being held, the core pieces are heat-treated at a temperature higher than that of melting the silver brazing material and glass and in a non-oxidizing atmosphere and at a pressure less than one atmospheric pressure. Therefore, the silver brazing films in abutting against each other and the glass films in abutting against each other, are subjected to a diffused junction, thereby enabling the Fe-Al-Si series magnetic alloys to form a strong junction with each other. Hence, the non-magnetic film and glass film, when formed, are controlled in thickness to facilitate control of the gap width, whereby the formation of a gap at the Fe-Al-Si series magnetic alloy magnetic head, which has hitherto been considered difficult, has been made easy to thereby have facilitated the formation of gaps of intensive mechanical strength and high accuracy. This has greatly facilitated the manufacture of Fe-Al-Si series magnetic alloy magnetic heads having gaps suitable for high density magnetic recording heads.

Also, when the composition of glass is confined to the $SiO_2$-PbO-$Na_2O$ series, since the coefficient of thermal expansion (about $11 \times 10^{-6}/°C$.) of the glass coincides well with that of the Fe-Al-Si series magnetic alloy, the $ZrO_2$, MgO, MgO or the $MgO.Al_2O_3$, it is difficult to thermally distort the magnetic head, thereby making it possible to obtain intensive sticking strength.

Although the glass is herewith defined to the $SiO_2$-PbO-$Na_2O$ series, glass other than this may be used, when its coefficient of thermal expansion coincides with that of an Fe-Al-Si alloy, the ZrO, MgO or the MgO-$Al_2O_3$, to obtain a magnetic head having a considerably intensive sticking force.

For the heat treatment to weld the Fe-Al-Si series magnetic alloy in this embodiment, the atmosphere may not be defined to $N_2$ or a vacuum, but may be effective in all the non-magnetic atmospheres. This has been confirmed.

A Fe-Al-Si series magnetic alloy rod of 20 mm in length was provided with a groove for containing the wirings and of 0.35 mm in width formed by a diamond grindstone to thereby prepare a pair of boat-like-shaped chips of head piece, the chips being subjected to mirror-polishing (the maximum surface roughness R max. is 0.01 μm).

As seen from FIG. 2-(c), the front gap forming surfaces are provided wih a zirconium oxide ($ZrO_2$) film by means of the sputtering and a glass film is formed on the $ZrO_2$ film also by means of the sputtering. In this case, the rear gap forming portions were covered to be free from ZrO or glass. The aforesaid zirconium oxide film was 0.15 μm in uniform thickness, and the aforesaid glass film was 0.05 μm in uniform thickness and of lead glass mainly comprising $SiO_2$ of 25 wt.%, PbO of 60 wt.% and $Na_2O$ of 15 wt.% and having a softening point at a temperature of about 580° C.

Although several embodiments have been described, they are merely exemplary of the invention and are not to be construed as limiting it; the invention being defined solely by the appended claims.

What is claimed is:

1. An iron-aluminum-silicon (Fe-Al-Si) series magnetic alloy head for a magnetic recording medium, consists essentially of:

a pair of Fe-Al-Si alloy core pieces which respectively have front gap forming surfaces forming therebetween a front gap facing said magnetic recording medium and rear gap forming surfaces forming therebetween a rear gap for junctioning said core pieces;

ceramic films formed respectively on said front gap forming surfaces of said core pieces;

a glass film filling a gap between said ceramic films; and a silver-copper-indium (Ag-Cu-In) series alloy film filling said rear gap.

2. An iron-aluminum-silicon (Fe-Al-Si) series magnetic alloy head according to claim 1, wherein each of said ceramic films consists essentially of a film selected from the group consisting of zirconium oxide ($ZrO_2$), magnesium oxide (MgO), spinel (MgO.Al$_2$O$_3$) and silicon oxide (SiO$_2$).

3. An iron-aluminum-silicon (Fe-Al-Si) series magnetic alloy head according to claim 1, where in said glass film consists essentially of a lead oxide-sodium oxide-silicon oxide (PbO-Na$_2$O-SiO$_2$) series alloy glass film.

4. An iron-aluminum-silicon (Fe-Al-Si) series magnetic alloy head according to claim 3, wherein said lead oxide-sodium oxide-silicon oxide (PbO-Na$_2$O-SiO$_2$) series alloy glass film contains 20 to 80 wt% of SiO$_2$.

5. An iron-aluminum-silicon (Fe-Al-Si) series magnetic alloy head according to claim 1, wherein said silver-copper-indium (Ag-Cu-In) series alloy film consists essentially of 20 to 85 wt% of silver (Ag), 10 to 50 wt% of copper (Cu) and 1 to 30 wt% of indium (In).

* * * * *